(12) United States Patent
Manders

(10) Patent No.: US 8,322,783 B2
(45) Date of Patent: Dec. 4, 2012

(54) ROOF ASSEMBLY FOR A VEHICLE

(75) Inventor: Peter Christiaan Leonardus Johannes Manders, Horst (NL)

(73) Assignee: Inalfa Roof Systems Group B.V., Venray (NL)

( * ) Notice: Subject to any disclaimer, the term of this patent is extended or adjusted under 35 U.S.C. 154(b) by 0 days.

(21) Appl. No.: 13/146,999

(22) PCT Filed: Feb. 3, 2009

(86) PCT No.: PCT/EP2009/051196
§ 371 (c)(1),
(2), (4) Date: Jul. 29, 2011

(87) PCT Pub. No.: WO2010/088951
PCT Pub. Date: Aug. 12, 2010

(65) Prior Publication Data
US 2011/0285181 A1 Nov. 24, 2011

(51) Int. Cl.
*B60J 7/047* (2006.01)
(52) U.S. Cl. .................................. 296/223; 296/216.03
(58) Field of Classification Search ...... 296/216.01–224
See application file for complete search history.

(56) References Cited

U.S. PATENT DOCUMENTS

| 6,471,286 | B1 | 10/2002 | Manders |
| 6,957,851 | B2 | 10/2005 | Manders |
| 2004/0007902 | A1 | 1/2004 | Manders |

FOREIGN PATENT DOCUMENTS

WO  WO 00/06403  2/2000

OTHER PUBLICATIONS

European Search Report and the Written Opinion of the European Patent Office Patent Office in counterpart foreign application No. PCT/EP2009/051196 filed Feb. 3, 2009.

*Primary Examiner* — Dennis Pedder
(74) *Attorney, Agent, or Firm* — Steven M. Koehler; Westman, Champlin & Kelly, P.A.

(57) ABSTRACT

A roof assembly for a vehicle having an opening in the fixed roof comprises a stationary guide rail on at least one side of the roof opening and a slidable slide with an operating mechanism. At least one closure element is supported by the operating mechanism and is adjustable between a closed position, in which it closes the roof opening at least partially, and an open position, in which it releases the roof opening at least partially. Each operating mechanism comprises a laterally extending curve rib and a guide member engaging around the curve rib and being attached to a carrier. The curve rib and carrier of the guide member are each attached to either one of the closure element and the slide and are adapted to slide with respect to each other. The guide member is rotatably attached to the carrier so as to compensate for a variation in inclination between the carrier and curve rib at the position of the guide member.

13 Claims, 6 Drawing Sheets

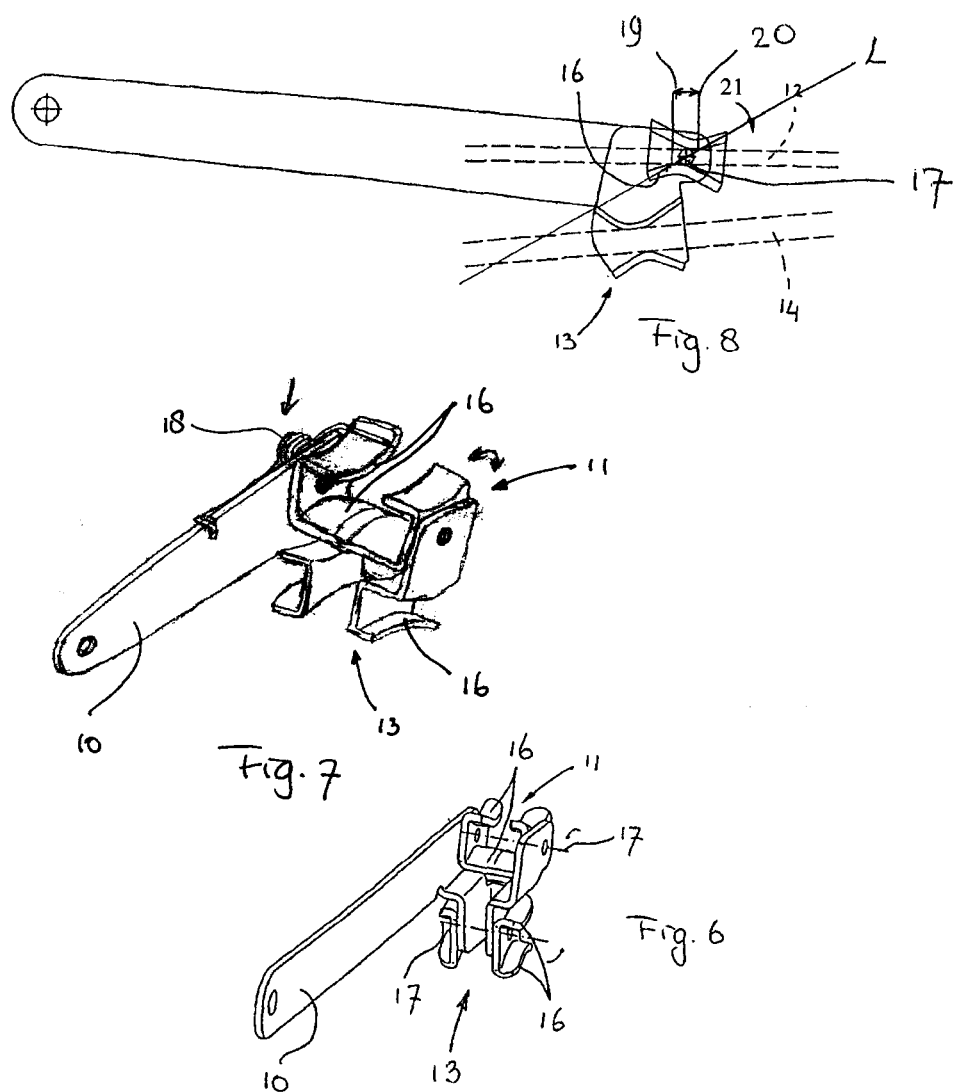

US 8,322,783 B2

ROOF ASSEMBLY FOR A VEHICLE

CROSS-REFERENCE TO RELATED APPLICATION

This application is a Section 371 National Stage Application of International Application PCT/EP2009/051196 filed Feb. 3, 2009 and published as WO/2010/088951 in English. A Roof Assembly for a Vehicle

BACKGROUND

The discussion below is merely provided for general background information and is not intended to be used as an aid in determining the scope of the claimed subject matter.

An aspect of the invention relates to a roof assembly for a vehicle having an opening in the fixed roof.

Such roof assembly is known from WO 00/06403, for example. In this roof, the curve rib has a height or thickness which varies along the length depending on the relative position between the carrier and the curve rib. This is done to avoid rattling or jamming of the guide member. This causes a very detailed process of fine tuning during industrialization of the design.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

An aspect of the present invention is a roof assembly for a vehicle having an opening in the fixed roof. The roof assembly includes a stationary part configured for attachment to the roof, having a stationary guide rail on at least one side of the roof opening and a slidable slide with an operating mechanism. At least one closure element is supported by the operating mechanism, which is adjustable between a closed position, in which it closes the roof opening at least partially, and an open position, in which it releases the roof opening at least partially. Each operating mechanism includes at least one laterally extending curve rib and a guide member engaging around the curve rib and being attached to a carrier. The curve rib and carrier of the guide member are each connected to either one of the closure element and the slide and are adapted to slide with respect to each other.

The guide member is movably attached to the carrier so as to compensate for a variation in inclination between the carrier and curve rib at the position of the guide member. Due to this feature it is possible to use a curve rib that is of a substantially constant thickness because the orientation between the carrier and the curve rib has no influence on the orientation between the guide member and the curve rib, which may be substantially the same during the whole travel of the guide member along the curve rib. The feature of the invention makes it also possible to use the same curve rib for different functions, i.e.

to move a closure panel in different paths, because the carrier may take any orientation with respect to the curve rib. This also allows for a more complex shaping of the curve rib and larger contact area between the guide member and the curve rib.

The simplest way of attaching the guide member to the carrier is to do it rotatably around a substantially horizontal axis.

To further improve the resistance to rattling, also over longer periods of time, the guide member may be biased by a spring member, in particular a torsion spring.

In one embodiment, the guide member comprises cams having an apex engaging on either side of the curve rib, and being formed on a common plate which is pivotally attached to the carrier. The guide member may be formed from metal sheet, but plastic, aluminum or a combination of these or other materials is also conceivable.

In case a torsion spring is used it is convenient that the cams are asymmetrical with respect to an axis of rotation of the guide member, such that a line between the apices of the cams is non-perpendicular with respect to a portion of the curve rib within the guide member.

BRIEF DESCRIPTION OF THE DRAWINGS

Aspects of invention will be explained in more detail hereafter with reference to the drawings, which schematically show embodiments of the invention.

FIG. 6 is a perspective view of the guide member and carrier of the operating mechanism of the roof assembly of FIG. 1.

FIG. 7 is a perspective view corresponding to that of FIG. 6 of a variation of the embodiment of the roof assembly.

FIG. 8 is a simplified side view of the carrier and guide members of FIG. 7, to show the design of the cams of the guide members.

DETAILED DESCRIPTION OF THE ILLUSTRATIVE EMBODIMENTS

The drawings show an embodiment of a roof assembly for a vehicle comprising a fixed roof 1. In the fixed roof 1 there is provided a roof opening 2. The fixed roof 1 of the vehicle may form part of the vehicle, but may also form part of the roof assembly which is built in the vehicle as a complete roof.

The roof assembly comprises at least one closure element, here in the form of a rigid, preferably a mainly transparent glass or plastic panel 3. The closure element could also be constructed differently, or the roof assembly may include several closure elements.

Figure 1:
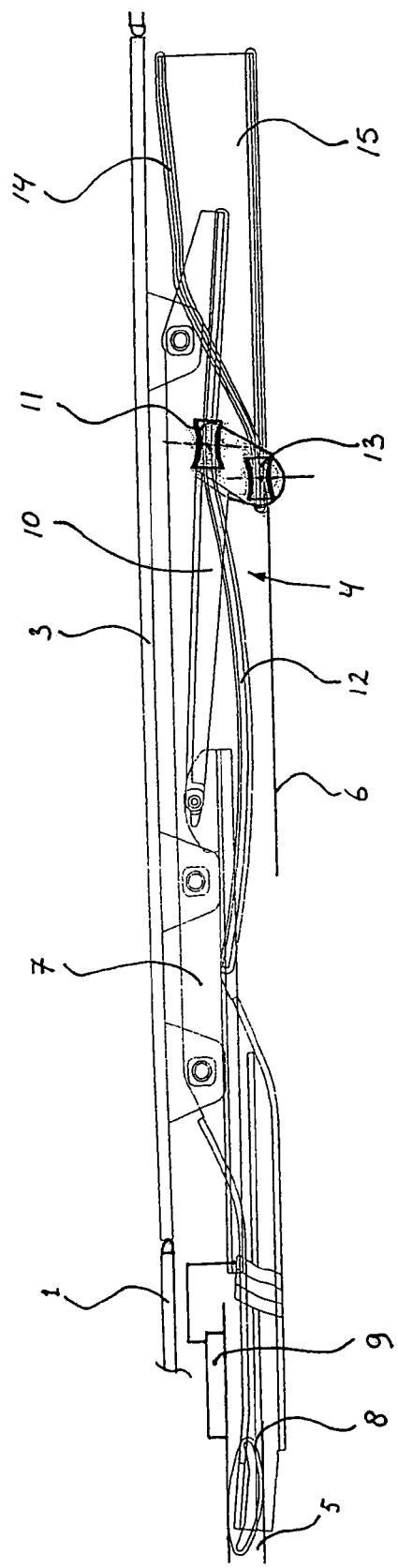
FIGS. 1-5 are longitudinal sectional views of an embodiment of a roof assembly in five different positions thereof.
Figure 2:
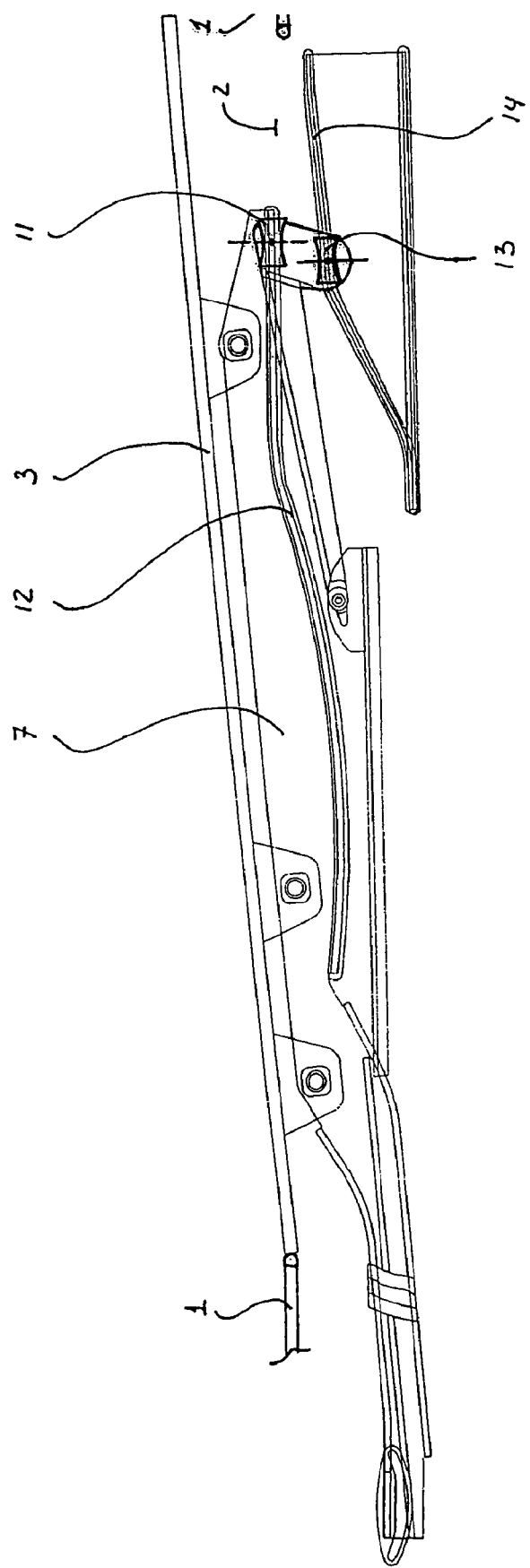
Figure 3:
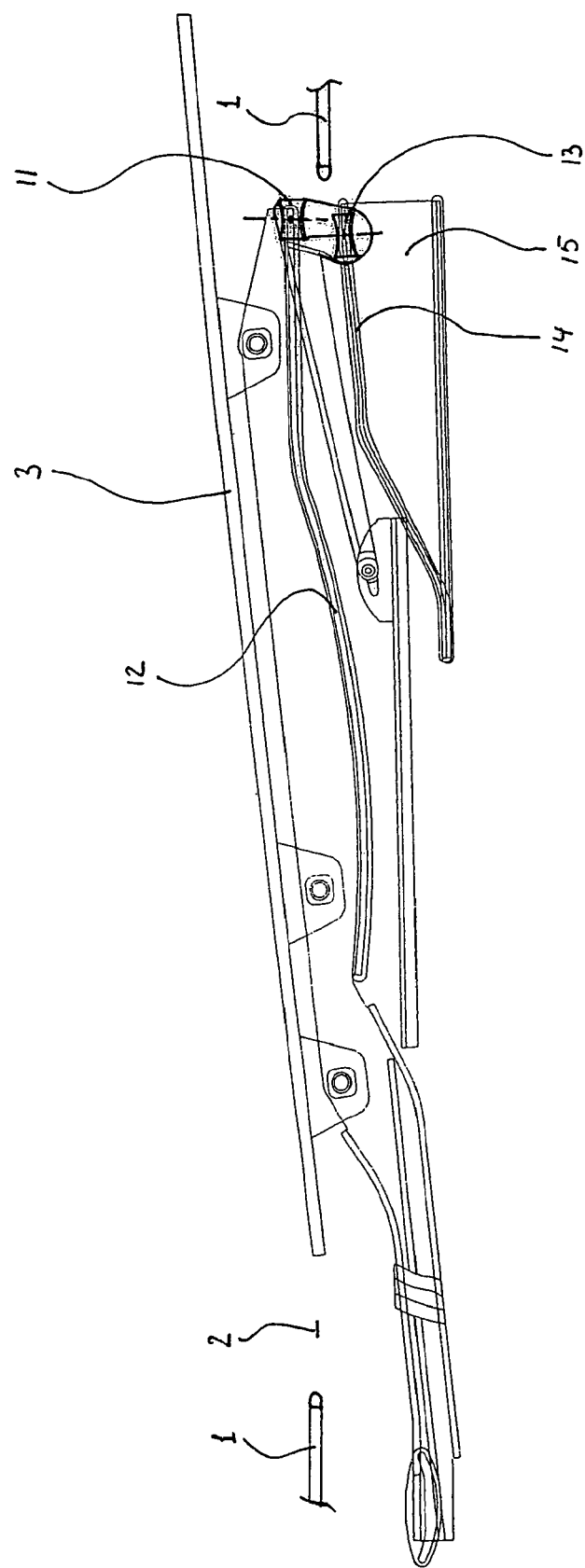
Figure 4:
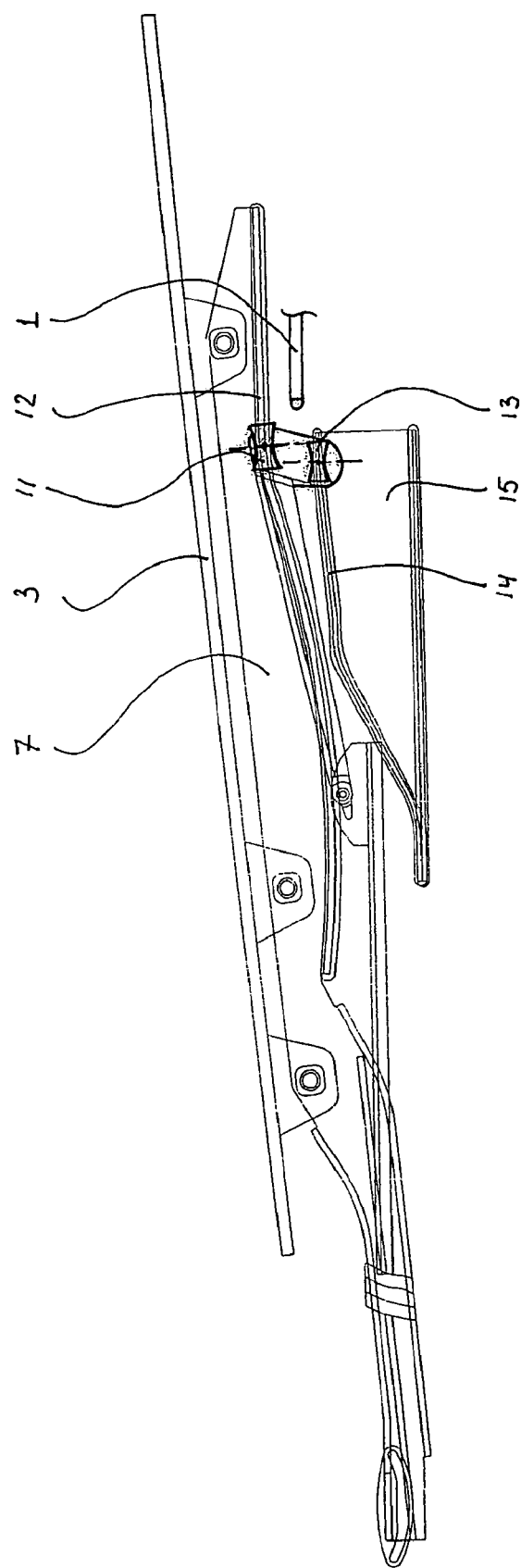
Figure 5:
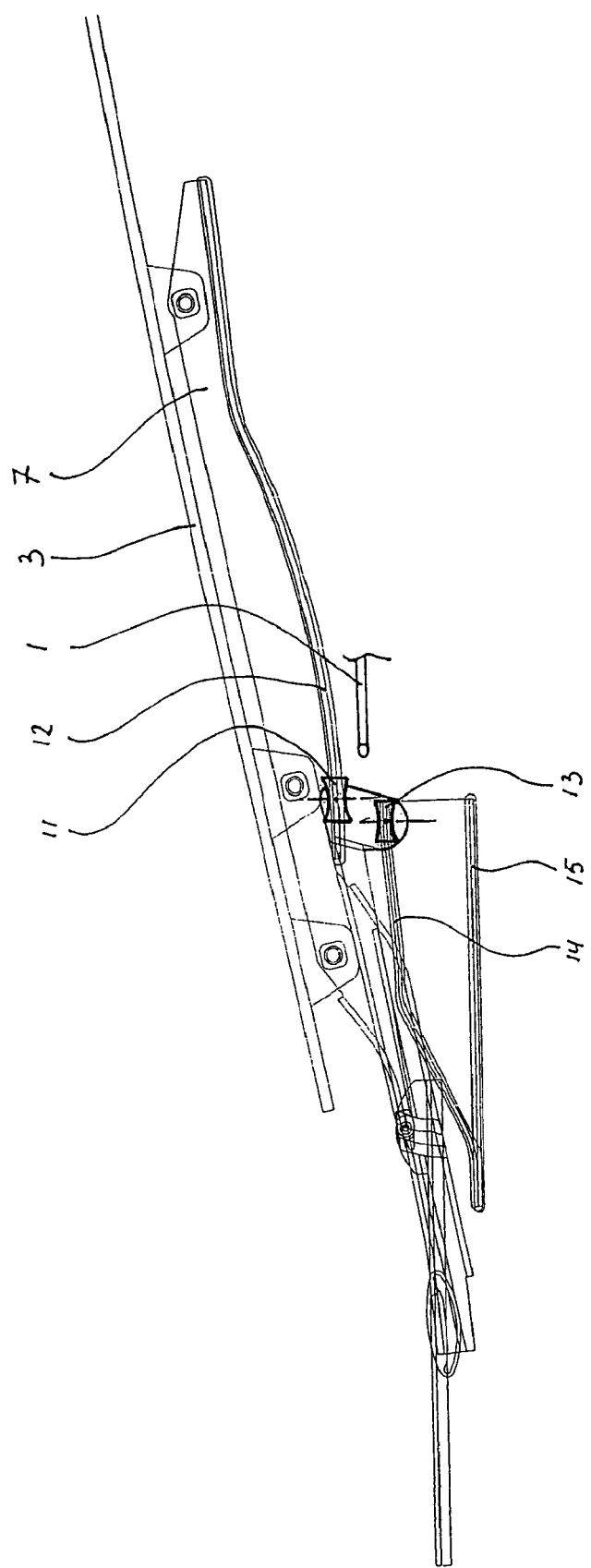

The roof assembly is of the so-called spoiler type which means that the panel 3 is movable from a closed position in the roof opening (FIG. 1), preferably flush with the fixed roof 1, to a rearwardly displaced position above the roof portion behind the roof opening 2 (FIG. 5). In the embodiment shown, the panel 3 can first be moved to a venting position in which the rear edge of the panel 3 is mainly tilted and the panel 3 is kept substantially stationary in longitudinal direction of the vehicle (FIG. 2). After this tilting to the venting position according to FIG. 2, the panel is displaced rearwardly, first to the positions of FIGS. 3 and 4 and then to the end position of FIG. 5. From this position, the panel 3 may be moved in opposite direction to the closed position of FIG. 1 again.

In order to enable the panel 3 to perform the movements as described above, it is supported by an operating mechanism 4, preferably on each longitudinal side of the roof opening 2. The drawings show one operating mechanism 4, but in the embodiment shown there is another operating mechanism on the other side of the roof opening 2, the parts of which will generally be a mirror image of the parts as shown. The operating mechanism and its functions are disclosed in U.S. Pat. No. 6,957,851, the contents of which are incorporated herein by reference thereto. The operating mechanism 4 is mounted in a stationary guide rail 5 which forms part of, or is mounted to a stationary part of the roof assembly, generally a frame 6 which is mounted to the fixed roof 1 of the vehicle.

The operating mechanism 4 includes a link plate 7 mounted to the panel 3 along the longitudinal side edge thereof. The link plate 7 has a front guide shoe 8 with which the front of the panel 3 is slidably guided in a groove of the stationary guide rail 5 and which front guide shoe 8, in the embodiment shown, also functions as a front pivot of the panel 3 about which the link plate 7 may be pivoted. It would also be possible to have the sliding and the pivoting functions separated.

The operating mechanism 4 is driven and actuated by means of a driving slide 9 which is guided in the stationary guide rail 5 and which is controlled by a driving means such as an electric motor or a hand crank which is connected to the driving slide 9, for example through a push and pull cable (not shown).

The operating mechanism 4 also includes a rear support for the panel 3 positioned a (variable) distance behind the front guide shoe 8 and constructed as an arm 10 functioning as a carrier for a first guide member 11 and driven during at least a part of the movement of the panel 3 by the driving slide 9. The first guide member 11 is slidably in engagement with the link plate 7 of the panel 3 through a first guide track formed in this case by two laterally projecting curve ribs 12 extending in opposite directions, i.e. away from each other. A second guide member 13 on the arm 10 is slidably in engagement with a second guide track formed by two laterally extending ribs 14 which, however, extend towards each other. The curve ribs 14 are formed on a curve plate 15 which is stationary with respect to the guide rail 5.

It should be understood that the guide tracks could be formed by one curve only, while the invention is also useful for operating mechanisms having only one guide track either formed on the panel, on the slide or the stationary part, and in engagement with a guide member sliding with respect thereto.

FIG. 6 shows in a simplified form the carrier arm 10 carrying the two guide members 11 and 13. As is shown, for each curve rib there are provided two opposite cams 16 formed in this case of sheet material bent in the required shape. At least one of the guide members 11, 13, but in this embodiment both guide members 11, 13 are rotatably attached to the carrier arm 10 through a substantially horizontal axis of rotation 17 allowing the guide members 11, 13 to rotate with respect to carrier arm 10, so as to be able to assume the same orientation with respect to the respective curve rib, irrespective of the curvature of the curve rib and the inclination of the carrier arm. The cams of the movable guide member may have a relatively large radius due to their constant orientation with respect to the curve rib, leading to smaller loads, less wear and higher quality in the later lifecycle.

In the embodiment of FIGS. 7 and 8, the second guide member 13 is fixed to the carrier arm 10 and only the first guide member 11 is rotatable. This embodiment may be preferred if the second curve rib 14 is relatively straight. As is shown in FIG. 8, the cams 16 of the first guide member 11 are asymmetrical such that the line L between apices 19, 20 of the two cams 16 is not perpendicular to the portion of the curve rib 12 within the guide member 11 and are offset with respect to the axis of rotation 17. The apices 19, 20 are kept in engagement with the curve rib 12 by means of a torsion spring 18 mounted to the carrier arm 10 and biasing the guide member 11 in the direction indicated by arrow 21. This eliminates rattles and ensures a smooth movement of the guide member 11 along the curve rib 12.

From the foregoing it follows that the invention provides a roof assembly and an operating mechanism which create more freedom in shaping the curve rib, prevent fine-tuning and facilitate quality control in the industrialisation phase, create possibilities to use the curve rib for more operating movements, decrease load on the guide member and curve rib and eliminate play.

The invention is not limited to the embodiment shown in the drawing and described before which may be varied in different manners within the scope of the appended claims. The invention is not restricted to the above-described embodiment as shown in the drawing, which can be varied in several ways without departing from the scope of the invention. Thus, the invention can also be used with other types of roof assemblies, such as lifting roofs, spoiler roofs and other kinds of roofs comprising panels or other types of single or multiple closure element. The guide members and guide tracks could also be kinematically reversed. The guide member may also be movably attached to the carrier in another way, like through a pin-slot connection or the like.

The invention claimed is:

1. A roof assembly for a vehicle having an opening in the fixed roof, comprising a stationary part configured for attachment to the roof, having a stationary guide rail on at least one side of the roof opening and a slidable slide with an operating mechanism, at least one closure element supported by the operating mechanism, which is adjustable between a closed position, in which it closes the roof opening at least partially, and an open position, in which it releases the roof opening at least partially, wherein each operating mechanism comprises at least one laterally extending curve rib and a guide member engaging around the curve rib and being attached to a carrier, said curve rib and carrier of the guide member being configured to slide with respect to each other, wherein said guide member is movably attached to the carrier so as to compensate for a variation in inclination between the carrier and curve rib at the position of the guide member.

2. The roof assembly according to claim 1, wherein the guide member is attached to the carrier rotatably around a substantially horizontal axis.

3. The roof assembly according to claim 1, wherein the guide member is rotatably biased by a spring member.

4. The roof assembly according to claim 1, wherein the guide member comprises cams having an apex engaging on either side of the curve rib.

5. The roof assembly according to claim 4, wherein the cams are formed on a common plate which is pivotally attached to the carrier.

6. The roof assembly according to claim 5, wherein the guide member is formed from metal sheet.

7. The roof assembly according to claim 2, wherein the cams are asymmetrical with respect to an axis of rotation of the guide member, such that a line between the apices of the cams is non-perpendicular to a portion of the curve rib within the guide member.

8. The roof assembly according to claim 1, wherein the carrier is an arm connected to the slide.

9. The roof assembly according to claim 1, wherein the operating mechanism includes a first curve rib connected to the closure element and a second curve rib connected to the guide rail, the carrier being provided with two guide members, one for the closure curve rib and one for the guide rail curve rib, at least one guide member being movably attached to the carrier.

10. The roof assembly of claim 9, wherein both guide members are movably attached to the carrier.

11. The roof assembly of claim 1, wherein the curve rib is attached to the closure element.

12. The roof assembly of claim 1, wherein the curve rib is attached to the guide rail.

13. The roof assembly of claim 1, wherein the carrier is attached to the slide.

* * * * *